(12) United States Patent
Kato

(10) Patent No.: US 6,556,758 B2
(45) Date of Patent: Apr. 29, 2003

(54) OPTICAL FIBER AND OPTICAL TRANSMISSION LINE INCLUDING THE SAME

(75) Inventor: Takatoshi Kato, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 94 days.

(21) Appl. No.: 09/801,193

(22) Filed: Mar. 8, 2001

(65) Prior Publication Data

US 2001/0019651 A1 Sep. 6, 2001

Related U.S. Application Data

(63) Continuation-in-part of application No. PCT/JP00/02487, filed on Apr. 17, 2000.

(30) Foreign Application Priority Data

Apr. 16, 1999 (JP) ............................................. 11-109627
Sep. 13, 1999 (JP) ............................................. 11-259189

(51) Int. Cl.[7] ................................................. G02B 6/02
(52) U.S. Cl. ......................... 385/127; 385/123; 385/126
(58) Field of Search ................................. 385/123–128

(56) References Cited

U.S. PATENT DOCUMENTS

| | | | |
|---|---|---|---|
| 4,715,679 A | * 12/1987 | Bhagavatula | 385/124 |
| 5,553,185 A | 9/1996 | Antos et al. | |
| 5,684,909 A | 11/1997 | Liu | |
| 5,854,871 A | * 12/1998 | Akasaka | 359/161 |
| 5,905,838 A | * 5/1999 | Judy et al. | 359/109 |
| 6,044,191 A | * 3/2000 | Berkey et al. | 385/123 |
| 6,421,490 B1 | * 7/2002 | Liu | 385/127 |

FOREIGN PATENT DOCUMENTS

| | | |
|---|---|---|
| EP | 0 724 171 | 7/1996 |
| EP | 0737873 | 10/1996 |
| EP | 0851245 | 7/1998 |
| EP | 0 883 002 | 12/1998 |
| EP | 0959374 | 11/1999 |
| GB | 2116744 | 9/1983 |
| JP | 11-084159 | 3/1999 |
| WO | WO 99/30193 | 6/1999 |
| WO | 99/42869 | 8/1999 |
| WO | 00/63733 | 10/2000 |

OTHER PUBLICATIONS

"Design and Fabrication of Locally Dispersion–Flattened Large Effective Area Fibers", by Liu et al., ECOC'98 (Sep. 20–24, 1998), pp. 37–38.

(List continued on next page.)

Primary Examiner—Robert H. Kim
Assistant Examiner—Michael H Caley
(74) Attorney, Agent, or Firm—McDermott, Will & Emery

(57) ABSTRACT

This invention relates to an optical fiber having a structure suitable for long-haul transmission of optical signals having wavelengths different from each other in a wavelength band of 1530 to 1620 nm, and an optical transmission line including the same. The optical transmission line of the present invention includes one or more first optical fibers and one or more second optical fibers. Each of the first optical fibers has a dispersion of +1.0 to +8.0 ps/nm/km in the wavelength band of 1530 to 1620 nm, and a difference between a maximum value and a minimum value of the dispersion thereof is 3.0 ps/nm/km or less. Each of the second optical fibers has a dispersion of −1.0 to −8.0 ps/nm/km in the wavelength band of 1530 to 1620 nm, and a difference between a maximum value and a minimum value of the dispersion thereof is 3.0 ps/nm/km or less. From the above structure, as the whole optical transmission line, a difference between a maximum value and a minimum value of an average dispersion value obtained from each fiber length and each dispersion value of the first and second optical fibers can be suppressed to 2.0 ps/nm/km or less.

21 Claims, 10 Drawing Sheets

OTHER PUBLICATIONS

"Practically Feasible Dispersion Flattened Fibers Produced by VAD Technique", by Yokoyama et al., ECOC'98 (Sep. 20–24, 1998), pp. 131–132.

"Optical Amplification Characteristics Around 1.58µm of Silica–Based Erbium–Doped Fibers Containing Phosphorous/Alumina as Codopants", by Kakui et al., OAA'98, TuC3, pp. 107–110.

"Reduced Dispersion Slope, Non–Zero Dispersion Fiber", by Peckham et al., ECOC'98 (Sep. 20–24, 1998), pp. 139–140.

A.V. Belov, "Profile Structure of Single–Mode Fibers with Low Nonlinear Properties for Long–Haul Communication Lines," Optics Communications, Mar. 15, 1999, vol. 161, pp. 212–216.

Yanming Liu, William B. Mattingly, David K. Smith, Claude E. Lacy, Jerrold A. Cline, and Evelyn M. De Liso, "Design and Fabrication of Locally Dispersion–Flattened Large Effective Area Fibers," ECOC'98, Sep. 20–24, 1998, Madrid, Spain, pp. 37–38.

David W. Peckham, Arthur F. Judy, R. Brad Kummer, "Reduced Dispersion Slope, Non–Zero Dispersion Fiber," ECOC'98, Sep. 20–24, 1998, Madrid, Spain, pp. 139–140.

H. Hatayama, Y. Yokoyawa, M. Onishi, T. Kato, E. Sasaoka, and M. Nishimura, "Jikko Danmenseki Wo Kakudai Shita Bunsan Flat Fiber," General Meeting in 1998, The Institute of Electronics, Information and Communication of Engineers, Mar. 6, 1998, C–3–59, pp 225.

Luo Jie, Lei Daoyu, Li Shiyu, Qi Qinian, Ye Peida, "Non–Zero Dispersion Shifted Fiber with Low Dispersion Slope," Proceedings of APCC/OECC'99, Oct. 18–22, 1999, Beijing, China, pp. 1373–1374.

English translation of Internation Prelminary Examination Report dated Aug. 23, 2001.

* cited by examiner

Fig.6

| | FIRST APPLICATIVE EXAMPLE | | SECOND APPLICATIVE EXAMPLE | | THIRD APPLICATIVE EXAMPLE | | FOURTH APPLICATIVE EXAMPLE | | FIFTH APPLICATIVE EXAMPLE | |
|---|---|---|---|---|---|---|---|---|---|---|
| | FIRST OPTICAL FIBER | SECOND OPTICAL FIBER | FIRST OPTICAL FIBER | SECOND OPTICAL FIBER | FIRST OPTICAL FIBER | SECOND OPTICAL FIBER | FIRST OPTICAL FIBER | SECOND OPTICAL FIBER | FIRST OPTICAL FIBER | SECOND OPTICAL FIBER |
| 2a ($\mu$m) | 6.0 | 5.7 | 6.2 | 5.6 | 6.3 | 6.0 | 6.9 | 6.6 | 6.1 | 5.5 |
| 2b ($\mu$m) | 17.5 | 16.7 | 16.7 | 14.7 | 16.6 | 15.7 | 17.6 | 16.7 | 15.1 | 13.6 |
| 2c ($\mu$m) | 25.0 | 23.8 | 24.6 | 22.3 | 25.2 | 23.8 | 26.6 | 25.3 | 24.3 | 22.0 |
| 2d ($\mu$m) | 50.0 | 47.6 | 49.2 | 44.6 | 50.4 | 47.6 | 53.2 | 50.6 | 48.6 | 44.0 |
| $\Delta$n1 (%) | 0.50 | 0.50 | 0.55 | 0.57 | 0.54 | 0.53 | 0.49 | 0.49 | 0.58 | 0.58 |
| $\Delta$n2 (%) | -0.15 | -0.15 | -0.15 | -0.15 | -0.15 | -0.15 | -0.15 | -0.15 | -0.18 | -0.18 |
| $\Delta$n3 (%) | 0.27 | 0.27 | 0.27 | 0.30 | 0.30 | 0.30 | 0.32 | 0.32 | 0.25 | 0.25 |
| $\Delta$n4 (%) | -0.15 | -0.15 | -0.15 | -0.15 | -0.15 | -0.15 | -0.15 | -0.15 | -0.18 | -0.18 |
| DISPERSION (ps/nm/km) @1530nm | 3.06 | -3.02 | 6.52 | -6.89 | 3.81 | -3.68 | 3.50 | -3.36 | 5.71 | -6.00 |
| DISPERSION (ps/nm/km) @1550nm | 3.15 | -3.04 | 6.86 | -6.78 | 3.82 | -3.75 | 3.34 | -3.33 | 5.96 | -5.91 |
| DISPERSION (ps/nm/km) @1620nm | 3.20 | -2.44 | 7.62 | -5.14 | 3.58 | -3.02 | 3.00 | -1.39 | 6.44 | -4.71 |
| DISPERSION DIFFERENCE $\Delta$D (ps/nm/km) AT WAVELENGTH 1530-1620nm | 0.14 | 0.60 | 1.10 | 1.75 | 0.23 | 0.73 | 0.50 | 1.94 | 0.73 | 1.29 |
| EFFECTIVE SECTIONAL AREA ($\mu$m$^2$) | 47.4 | 50.3 | 44.0 | 48.6 | 47.8 | 51.3 | 56.5 | 62.7 | 41.6 | 44.8 |
| MODE FIELD DIAMETER ($\mu$m) | 7.80 | 8.00 | 7.79 | 7.76 | 7.77 | 7.95 | 8.29 | 8.51 | 7.30 | 7.51 |
| BENDING LOSS AT DIAMETER 32mm @1550nm | 0.2 | 1.2 | 0.002 | 0.02 | 0.004 | 0.04 | 0.003 | 0.02 | 0.0003 | 0.04 |
| BENDING LOSS AT DIAMETER 32mm @1620nm | 1.4 | 5.7 | 0.02 | 0.2 | 0.03 | 0.3 | 0.02 | 0.1 | 0.005 | 0.3 |
| CUT-OFF WAVELENGTH ($\mu$m) | 1.56 | 1.49 | 1.69 | 1.70 | 1.91 | 1.80 | 2.19 | 2.07 | 1.69 | 1.53 |
| DISPERSION DIFFERENCE $\Delta$D (ps/nm/km) IN WHOLE OPTICAL TRANSMISSION PATH | 0.5 | | 1.4 | | 0.2 | | 0.8 | | 1.0 | |

Fig.12A
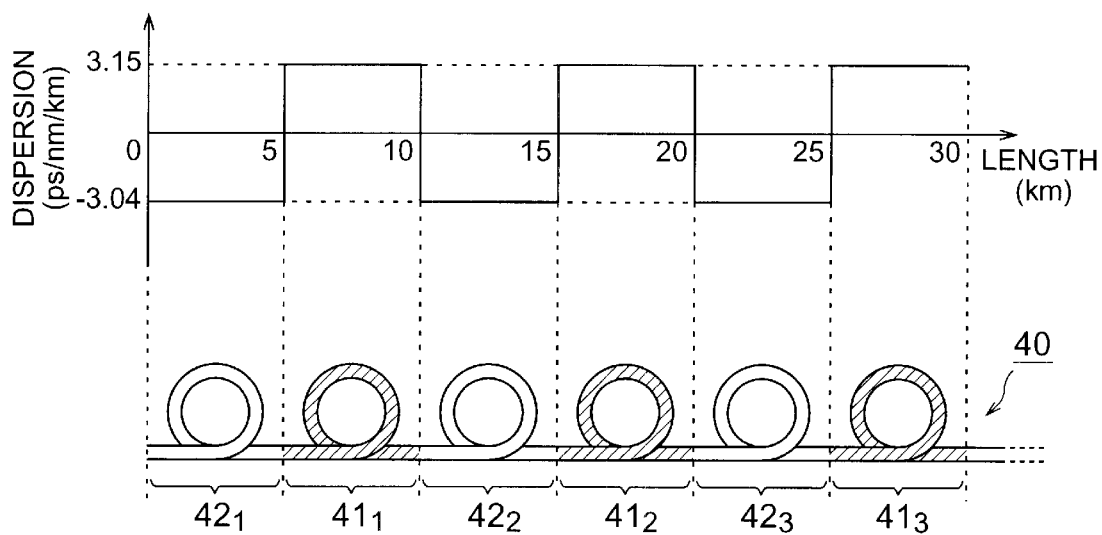
Fig.12B
Fig.13A
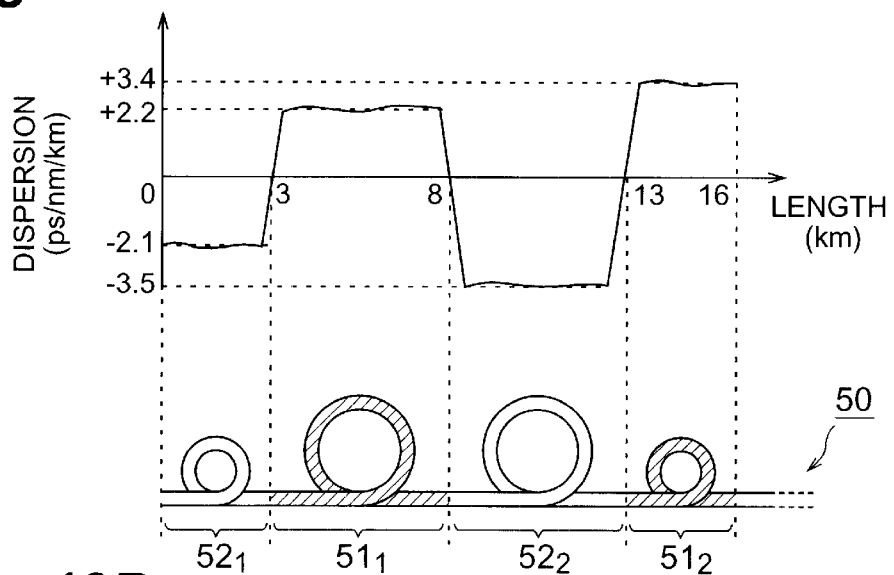
Fig.13B

OPTICAL FIBER AND OPTICAL TRANSMISSION LINE INCLUDING THE SAME

RELATED APPLICATIONS

This is a Continuation-In-Part application of International patent application Ser. No. PCT/JP00/02487 filed on Apr. 17, 2000, now pending.

BACKGROUND OF THE INVENTION

1. Field of the Invention

The present invention relates to an optical fiber suitable for long-haul transmission of optical signals having wavelengths different from each other, and an optical transmission line including the same.

2. Related Background Art

In an optical communication system using an optical fiber network, long-haul and large capacity optical communication is possible. Particularly, in the recent increase in capacity, a wavelength division multiplexing (WDM) technique which enables transmission of a plurality of optical signals having wavelengths different from each other is used. This optical communication system is constituted by an optical transmitter for outputting optical signals, an optical amplifier for amplifying the optical signals, an optical fiber as an optical transmission line for transmitting the optical signals, an optical receiver for receiving the optical signals, and the like.

Among these structural elements, in the optical amplifier which is indispensable for obtaining a high S/N ratio, a wavelength band (amplification wavelength band) in which optical signals can be amplified is conventionally 1530 to 1565 nm. Thus, the other elements constituting the optical communication system have been designed so that they operate excellently in this amplification wavelength band. For example, an optical transmission line disclosed in D. W. Peckham, et al., "Reduced Dispersion Slope, Non-Zero Dispersion Fiber", ECOC' 98, pp. 130–140, 1998 (first document) or U.S. Pat. No. 5,684,909 (second document) is designed so that a deviation of dispersion in this amplification wavelength band, that is, a dispersion slope becomes small.

SUMMARY OF THE INVENTION

The present inventors examined the conventional optical communication system having the above structure, and consequently, found the problems as follows:

That is, as the performance of the optical amplifier is improved, the amplification wavelength band of the optical amplifier is being expanded from the foregoing wavelength band (1530 to 1565 nm) to the wavelength band of 1530 to 1620 nm including a longer wavelength side. This fact is introduced by, for example, M. Kakui, et al., "Optical Amplifications Characteristics around 1.58 μm of Silica-Based Erbium-Doped Fibers Containing Phosphorous/Alumina as Codopants", OAA'98, TuC3, pp. 107–110, 1998 (third document). As the amplification wavelength band of the optical amplifier is expanded, it is necessary that other elements are also designed so that they operate excellently in the expanded wavelength band of 1530 to 1620 nm. However, it was impossible to say that in the conventional optical fiber and the optical transmission line including the same, the dispersion slope is sufficiently small in the expanded amplification wavelength band of 1530 to 1620 nm.

For example, let us consider an optical transmission line in which a first optical fiber having a positive dispersion and a positive dispersion slope in the wavelength band of 1530 to 1620 nm and a second optical fiber having a negative dispersion and a positive dispersion slope in the wavelength band of 1530 to 1620 nm are connected to each other at a suitable length ratio. Incidentally, in this optical transmission line, it is assumed that a dispersion in the center wavelength 1575 nm of the wavelength band of 1530 to 1620 nm is 0, and a difference between the maximum value and the minimum value of the dispersion in the wavelength band of 1530 to 1620 nm is ΔD. FIG. 1 is a graph showing the dispersion of each of the optical transmission line, the first optical fiber, and the second optical fiber, and in FIG. 1, a graph G110 indicates the dispersion of the first optical fiber, a graph G120 indicates the dispersion of the second optical fiber, and a graph G130 indicates the dispersion (obtained by the fiber length and dispersion value of each of the first and second optical fibers) of the optical transmission line including the first and second optical fibers.

FIG. 2 is a graph showing the relation between transmission distance and accumulated dispersion with respect to the optical transmission line having the foregoing structure. In FIG. 2, G210 indicates the relation between the transmission distance and the accumulated dispersion value in the case where the difference ΔD is 3.6 ps/nm/km, G220 indicates the relation in the case where the difference ΔD is 2.0 ps/nm/km, and G230 indicates the relation in the case where the difference ΔD is 1.0 ps/nm/km. Besides, FIG. 2 shows a value (arrow A in the drawing) of the accumulated dispersion which becomes a transmission limit when the bit rate of optical signals is 10 Gb/s, and a value (arrow B in the drawing) of the accumulated dispersion which becomes a transmission limit when the bit rate of optical signals is 20 Gb/s.

In the optical transmission line disclosed in the first document, the dispersion slope in the wavelength band of 1530 to 1620 nm is 0.04 ps/nm$^2$/km, and the difference ΔD between the maximum value and the minimum value of the dispersion in this wavelength band is 3.6 ps/nm/km. Thus, in the case of the optical transmission line of the first document, as is understood from FIG. 2, the optical signals of a bit rate of 10 Gb/s can be transmitted only over a distance of about 550 km, and the optical signals of a bit rate of 20 Gb/s can be transmitted only over a distance of about 150 km. For reference, when the difference ΔD is 2.0 ps/nm/km, the optical signals of a bit rate of 10 Gb/s can be transmitted over a distance of about 1000 km, and the optical signals of a bit rate of 20 Gb/s can be transmitted over a distance of about 250 km. Further, when the difference ΔD is 1.0 ps/nm/km, the optical signals of a bit rate of 10 Gb/s can be transmitted over a distance of about 2000 km, and the optical signals of a bit rate of 20 Gb/s can be transmitted over a distance of about 500 km.

The present invention has been made to solve the foregoing problems, and has an object to provide an optical fiber having a structure suitable for long-haul transmission of a plurality of optical signals having wavelengths different from each other in a wavelength band of 1530 to 1620 nm, and an optical transmission line including the same.

An optical transmission line of the present invention is an optical fiber transmission line disposed in at least one of places between an optical transmitter and an optical receiver, between an optical transmitter and an optical repeater including an optical amplifier, between optical repeaters, and between an optical repeater and an optical receiving station.

The optical transmission line of the present invention includes one or more first optical fibers, and one or more second optical fibers. However, the optical transmission line may be constituted by one first optical fiber and one second optical fiber, and in the case where a plurality of first optical fibers and a plurality of second optical fibers are mutually fused and connected, the order of connection of these optical fibers may be arbitrary.

Each of the first optical fibers has a dispersion of +1.0 to +8.0 ps/nm/km in a wavelength band of 1530 to 1620 nm, and a difference between the maximum value and the minimum value of the dispersion is 3.0 ps/nm/km or less, preferably 2.0 ps/nm/km or less. Besides, each of the second optical fibers has a dispersion of −1.0 to −8.0 ps/nm/km in the above wavelength band, and a difference between the maximum value and the minimum value of the dispersion is 3.0 ps/nm/km or less, preferably 2.0 ps/nm/km or less. The optical transmission line is characterized in that in the above wavelength band, an average dispersion value obtained from each fiber length and each dispersion value of the first and second optical fibers is 2.0 ps/nm/km or less, preferably 1.0 ps/nm/km or less, more preferably 0.5 ps/nm/km or less.

Incidentally, in the above structure, it is preferable that the dispersion (average dispersion value) of the whole optical transmission line of the present invention has opposite signs at the wavelength of 1530 nm and the wavelength of 1620 nm. Besides; in the case where the dispersion of the whole optical transmission line of the present invention becomes 0 at any one (ideally, near the center wavelength of the wavelength band) of the wavelength band, it is preferable that the absolute value of the average dispersion value is 1.0 ps/nm/km or less, and preferably 0.5 ps/nm/km or less.

According to the optical transmission line having the structure as described above, in the wavelength band of 1530 to 1620 nm, when the difference ΔD between the maximum value and the minimum value of the average dispersion value in the whole transmission line is 2.0 ps/nm/km or less (in the case where the average dispersion value becomes 0 at any one of the wavelength band, when the absolute value of the average dispersion value is 1.0 ps/nm/km or less), the optical signals of a bit rate of 10 Gb/s can be transmitted over a distance of about 1000 km, and the optical signals of a bit rate of 20 Gb/s can be transmitted over a distance of about 250 km. Further, in the wavelength band of 1530 to 1620 nm, when the difference ΔD between the maximum value and the minimum value of the average dispersion value is 1.0 ps/nm/km or less (in the case where the average dispersion value becomes 0 at any one of the wavelength band, when the absolute value of the average dispersion value is 0.5 ps/nm/km or less), the optical signals of a bit rate of 10 Gb/s can be transmitted over a distance of about 2000 km, and the optical signals of a bit rate of 20 Gb/s can be transmitted over a distance of about 500 km.

Besides, it is preferable that each of the first and second optical fibers has an effective area of 40 $\mu m^2$ or more at a wavelength of 1550 nm. In this case, since the light intensity per unit sectional area becomes low, the occurrence of a nonlinear optical phenomenon such as four-wave mixing is suppressed. Thus, it is possible to increase the power of an optical signal transmitting through the optical transmission line, and it becomes possible to extend a transmission distance.

Incidentally, the effective area $A_{eff}$ can be given by the following expression (1) as indicated in Japanese Patent Unexamined Publication No. Hei. 8-248251 (EP 0 724 171 A2).

$$A_{eff} = 2\pi \left( \int_0^\infty E^2 r dr \right)^2 \bigg/ \left( \int_0^\infty E^4 r dr \right) \quad (1)$$

Where, E is an electric field of transmission light, and r is a distance from the center of a core in the direction of a radius.

Besides, it is preferable that each of the first and second optical fibers has a bending loss of 0.5 dB or less at a wavelength of 1620 nm when it is wound one turn at a diameter of 32 mm. By this, in the wavelength band of 1530 to 1620 nm, the bending loss can be made sufficiently low, and an increase in transmission loss due to formation of a cable or the like can be effectively suppressed.

An aspect of an optical fiber which can be applied to the optical transmission line having the structure as described above may be an optical fiber in which in the wavelength band of 1530 to 1620 nm, an absolute value of its dispersion is 1.0 to 8.0 ps/nm/km and a difference between a maximum value and a minimum value of the dispersion is 3.0 ps/nm/km or less, preferably 2.0 ps/nm/km or less, and its bending loss is 0.5 dB or less at a wavelength of 1620 nm when it is wound one turn at a diameter of 32 mm. Incidentally, it is preferable that the optical fiber of this aspect also has an effective area of 40 $\mu m^2$ or more at a wavelength of 1550 nm. Besides, in order to suppress an increase in bending loss, another aspect may be an optical fiber in which in the wavelength band of 1530 to 1620 nm, an absolute value of its dispersion is 1.0 to 8.0 ps/nm/km and a difference between a maximum value and a minimum value of the dispersion is 3.0 ps/nm/km or less, preferably 2.0 ps/nm/km or less, and its effective area is less than 60 $\mu m^2$ at a wavelength of 1550 nm. However, this optical fiber of the other aspect has an effective area of 40 $\mu m^2$ or more at the wavelength of 1550 nm.

The optical fiber of the respective aspects has a structure in which a first core, a second core, a third core, an inner cladding, and an outer cladding are sequentially provided, while an optical axis is made the center. The first core extends along a predetermined axis. The second core is provided so as to surround the first core and has a refractive index lower than that of the first core. The third core is provided so as to surround the second core and has a refractive index higher than that of the second core. The inner cladding is provided so as to surround the third core and has a refractive index lower than that of the third core. The outer cladding is provided so as to surround the inner cladding and has a refractive index higher than that of the inner cladding.

Further, as an optical fiber which can be applied to the optical transmission line of the present invention, a unitary optical fiber with no connection point including first and second portions having core diameters different from each other by 2% or more can be applied. Incidentally, this optical fiber is characterized in that the first portion has a dispersion of +1.0 to +8.0 ps/nm/km in the wavelength band of 1530 to 1620 nm, and a difference between a maximum value and a minimum value of the dispersion is 3.0 ps/nm/km or less, preferably 2.0 ps/nm/km or less, and the second portion includes a dispersion of −1.0 to −8.0 ps/nm/km in the wavelength band, and a difference between a maximum value and a minimum value of the dispersion is 3.0 ps/nm/km or less, preferably 2.0 ps/nm/km or less. The optical fiber in which the core diameter is changed along the longitudinal direction like this is obtained by changing wire drawing tension at the time of manufacture, by changing an outer diameter of a core portion in an optical fiber parent material along the longitudinal direction, or the like. Since this optical fiber is a unitary optical fiber (dispersion-managed optical fiber) subjected to dispersion-managed, when a plurality of dispersion-managed optical fibers are fused and connected to each other and an optical transmission line is constituted, it is not necessary to consider the dispersion of each of the optical fibers, and it is possible to easily constitute an optical transmission line which enables longhaul transmission of optical signals having a plurality of wavelengths in the wavelength band of 1530 to 1620 nm. Incidentally, it is preferable that this dispersion-managed optical fiber also has the structure as described above.

Even in the optical transmission line constituted by one dispersion-managed optical fiber as described above or in the optical transmission line in which the plurality of dispersion-managed optical fibers are fused and connected, it is characterized in that a difference between a maximum value and a minimum value of an average dispersion value in a wavelength band of 1530 to 1620 nm is 2.0 ps/nm/km or less, preferably 1.0 ps/nm/km or less. Even in this optical transmission line, in the wavelength band of 1530 to 1620 nm, the difference ΔD between the maximum value and the minimum value of the average dispersion is 2.0 ps/nm/km or less, optical signals of a bit rate of 10 Gb/s can be transmitted over a distance of about 1000 km, and optical signals of a bit rate of 20 Gb/s can be transmitted over a distance of about 250 km. Further, in the wavelength band of 1530 to 1620 nm, when the difference ΔD between the maximum value and the minimum value of the average dispersion value is 1.0 ps/nm/km or less, optical signals of a bit rate of 10 Gb/s can be transmitted over a distance of about 2000 km, and optical signals of a bit rate of 20 Gb/s can be transmitted over a distance of about 500 km.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6 is a table showing optical characteristics of two kinds of optical fibers constituting each of first to fifth applicative examples of the optical transmission line of the present invention;

FIGS. 12A and 12B are views for explaining the structure of the second embodiment of the optical fiber of the optical transmission line of the present invention and dispersion characteristics (first applicative example); and FIGS. 13A and 13B are views for explaining the structure of the second embodiment of the optical transmission line of the present invention and dispersion characteristics (second applicative example).

DESCRIPTION OF THE PREFERRED EMBODIMENTS

Figure 1:
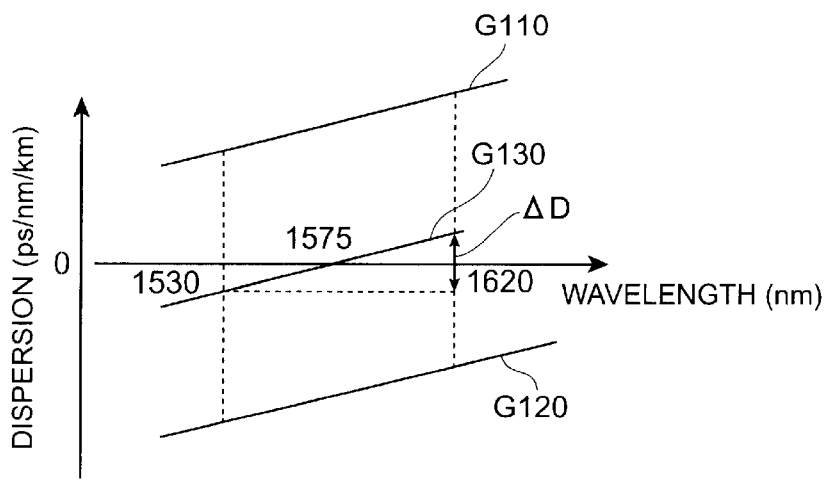
FIG. 1 is a view for explaining a dispersion of each of two kinds of optical fibers and a dispersion of an optical transmission line constituted by the two kinds of optical fibers.
Figure 2:
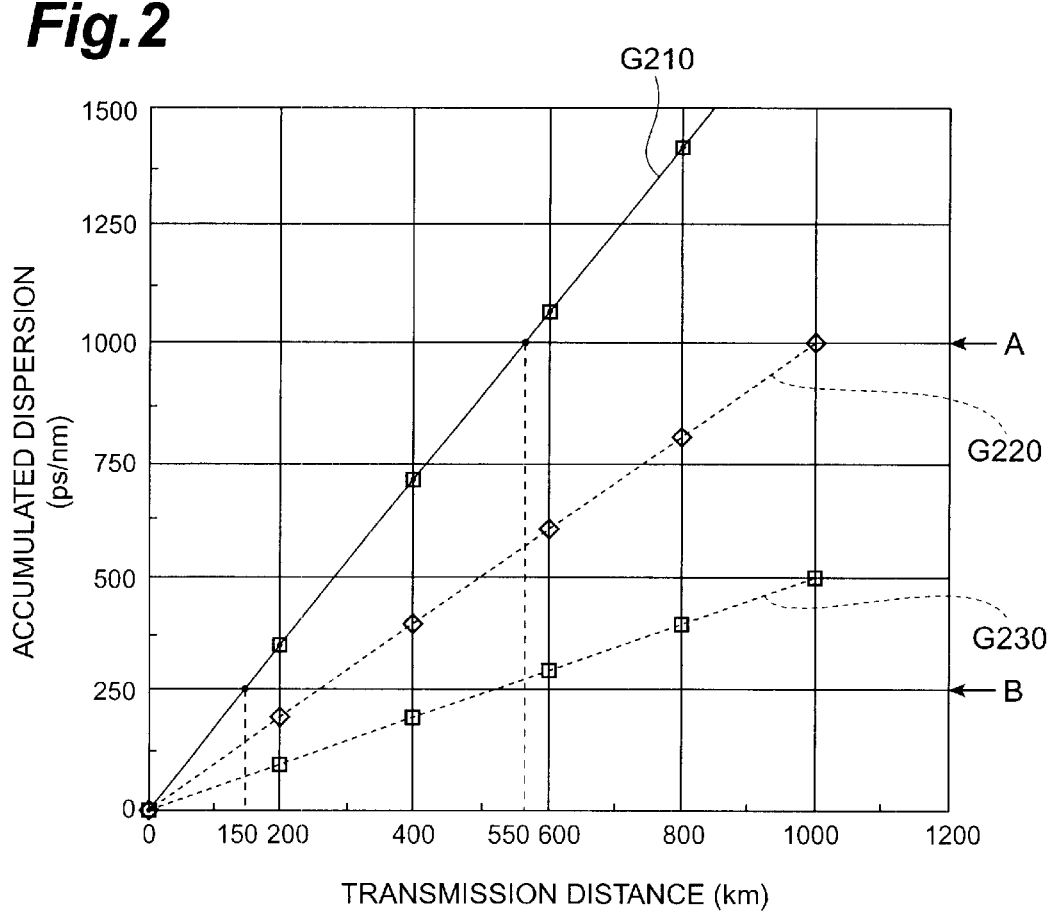
FIG. 2 is a graph showing the relation between a transmission distance and an accumulated dispersion.

Hereinafter, embodiments of optical transmission lines and optical fibers of the present invention will be described with reference to FIGS. 3A to 4B, FIGS. 5 to 11, and FIGS. 12A to 13B. Incidentally, with respect to the explanation of the drawings, the same elements are designated by the same characters and the duplicate explanation is omitted. As the need arises, FIG. 1 and FIG. 2 are also referred to.

First Embodiment

Figure 3A:
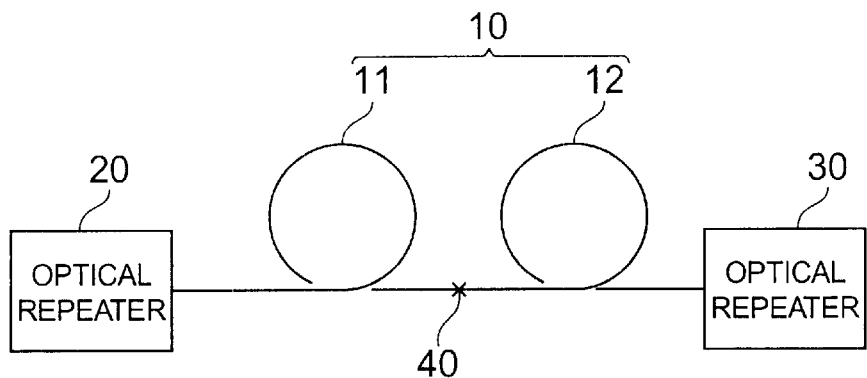
FIGS. 3A and 3B are views showing a schematic structure of an optical communication system including an optical transmission line of a first embodiment.
Figure 3B:
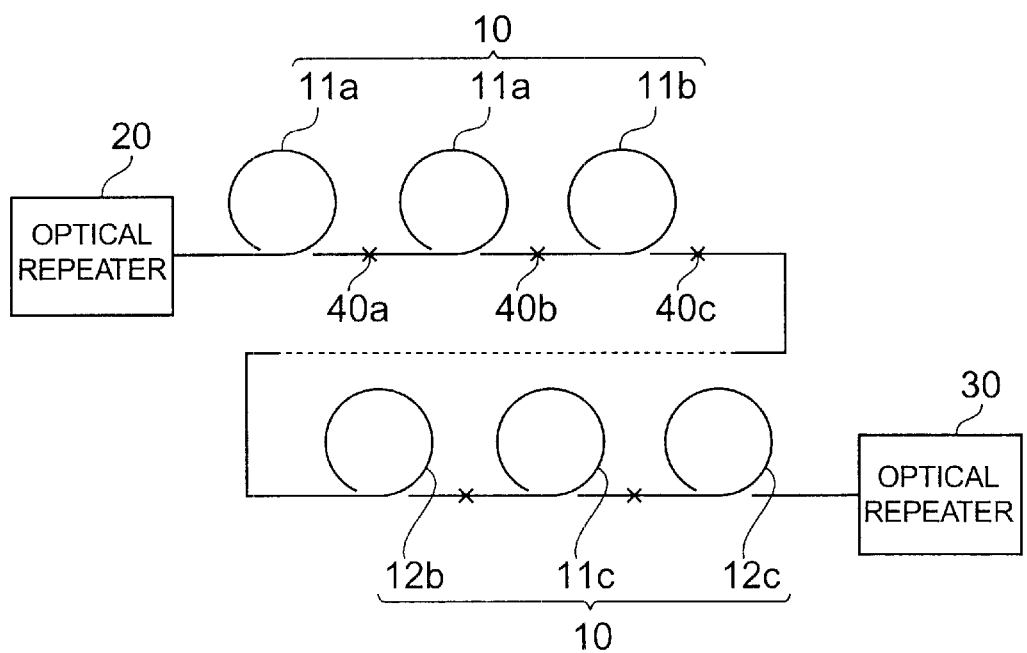

First, a first embodiment of an optical transmission line of the present invention will be described. FIGS. 3A and 3b are views showing a schematic structure of an optical communication system including an optical transmission line of the first embodiment, and as is understood from these drawings, an optical transmission line 10 of the first embodiment is an optical fiber transmission line disposed between optical repeaters 20 and 30. However, the optical repeaters 20 and 30 shown in the drawings may be any of an optical transmitter, a relay including an optical amplifier, and an optical transmitter. Thus, the optical transmission line 10 can be disposed at any of places between the optical transmitter and the optical receiver, between the optical transmitter and the optical repeater, between the respective optical repeaters, and between the optical repeater and the optical receiver.

In the structure shown in FIG. 3A, the optical transmission line 10 of the first embodiment is disposed between the respective optical repeaters 20 and 30, and is constituted by a fused and connected first optical fiber 11 and a second optical fiber 12. For example, if the optical repeater 20 is an optical transmitter, the optical repeater 20 outputs WDM signals (including a plurality of optical signals) of a wavelength band of 1530 to 1620 nm to the first optical fiber 11. The optical transmission line 10 transmits the WDM signals outputted from the optical repeater 20. If the optical repeater 30 is an optical receiver, the optical repeater 30 receives the WDM signals transmitted through the optical transmission line 10.

The first optical fiber 11 has a dispersion of +1.0 to +8.0 ps/nm/km in the wavelength band of 1530 to 1620 nm, and a difference between a maximum value and a minimum value of the dispersion is 3.0 ps/nm/km or less, preferably 2.0 ps/nm/km or less. On the other hand, the second optical fiber 12 has a dispersion of −1.0 to −8.0 ps/nm/km in the wavelength band of 1530 to 1620 nm, and a difference between a maximum value and a minimum value of the dispersion is 3.0 ps/nm/km or less, preferably 2.0 ps/nm/km or less. Each of the first optical fiber 11 and the second optical fiber 12 having the above optical characteristics does not have a zero-dispersion wavelength of 1530 to 1620 nm, it is possible to effectively suppress the occurrence of four-wave mixing.

Further, in the wavelength band of 1530 to 1620 nm, a difference ΔD between a maximum value and a minimum value of a dispersion of the whole optical transmission line 10, that is, an average dispersion value obtained from each fiber length and each dispersion value of the first and second optical fibers 11 and 12 is 2.0 ps/nm/km or less, preferably 1.0 ps/nm/km, more preferably 0.5 ps/nm/km or less. Incidentally, it is preferable that the average dispersion value of the optical transmission line 10 has opposite signs at the wavelength of 1530 nm and the wavelength of 1620 nm. In the case where the average dispersion value of the optical transmission line 10 becomes 0 at any one (ideally, near the center wavelength of the wavelength band) of the above wavelength band, it is preferable that the absolute value of the average dispersion value is 1.0 ps/nm/km or less, preferably 0.5 ps/nm/km or less. Here, the average dispersion value of the optical transmission line 10 is a value given by a weighted average value in view of the fiber length of each of the first optical fiber 11 and the second optical fiber 12, and means the dispersion value of the whole optical transmission line 10.

In the optical transmission line 10 structured as described above, since the difference ΔD between the maximum value and the minimum value of the dispersion (average dispersion value) in the wavelength band of 1530 to 1620 nm is sufficiently small, it is possible to effectively suppress the deterioration of the waveform of the optical signal due to the dispersion. That is, in the wavelength band of 1530 to 1620 nm, when the difference ΔD between the maximum value and the minimum value of the dispersion value is 2.0 ps/nm/km or less, the optical transmission line 10 can transmit the optical signal of a bit rate of 10 Gb/s over a distance of about 1000 km, and can transmit the optical signal of a bit rate of 20 Gb/s over a distance of about 250 km (see FIG. 2).

Further, when the difference ΔD between the maximum value and the minimum value of the average dispersion value of the optical transmission line 10 is 1.0 ps/nm/km or less, it can transmit the optical signal of a bit rate of 10 Gb/s over a distance of about 2000 km, and can transmit the optical signal of a bit rate of 20 Gb/s over a distance of about 500 km.

Incidentally, in addition to the structure shown in FIG. 3A, the optical transmission line 10 may include a structure in which a plurality of first optical fibers and a plurality of second optical fibers 12 are fused and connected, and the order of connection of these optical fibers is also arbitrary. FIG. 3B shows an example in which the optical transmission line of the first embodiment is constituted like this by a plurality of first optical fibers 11a to 11c and a plurality of second optical fibers 12a to 12c.

In addition, in the optical transmission line 10 having the structure (see FIGS. 3A and 3B) as described above, it is preferable that each of the first optical fiber 11 and the second optical fiber 12 has an effective area $A_{eff}$ of 40 $\mu m^2$ or more at a wavelength of 1550 nm. The size of this effective area is equal to or larger than the effective area of a normal dispersion-shifted optical fiber having a zero-dispersion wavelength near the wavelength of 1550 nm, and the light intensity per unit sectional area becomes low, so that the occurrence of a nonlinear optical phenomenon such as four-wave mixing can be effectively suppressed. Thus, the power of an optical signal transmitted through the optical transmission line 10 can be made high, and a transmission distance can be made long.

Besides, it is preferable that each of the first optical fiber 11 and the second optical fiber 12 has a bending loss of 0.5 dB or less when it is wound one turn at a diameter of 32 mm. In general, although the bending loss becomes large as the wavelength becomes long, the bending loss can be sufficiently suppressed in the wavelength band of 1530 to 1620 nm by regulating the bending loss at the side of the longest wavelength of the wavelength band, and it is possible to suppress an increase in transmission loss due to formation of a cable or the like.

Figure 4A:
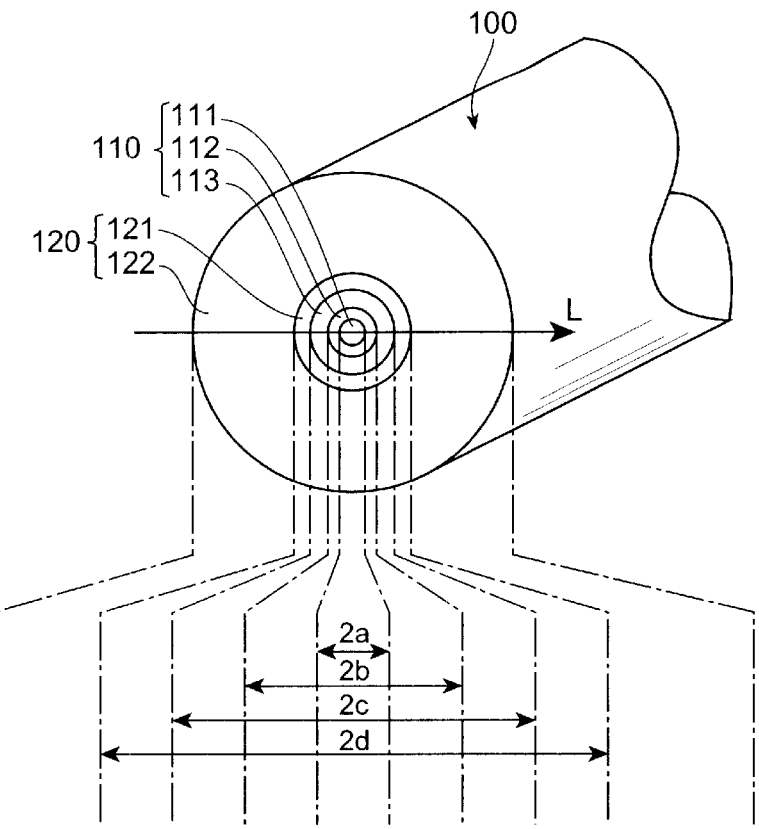
FIG. 4A is a view showing a sectional structure of an optical fiber which can be applied to an optical transmission line of the present invention.
Figure 4B:
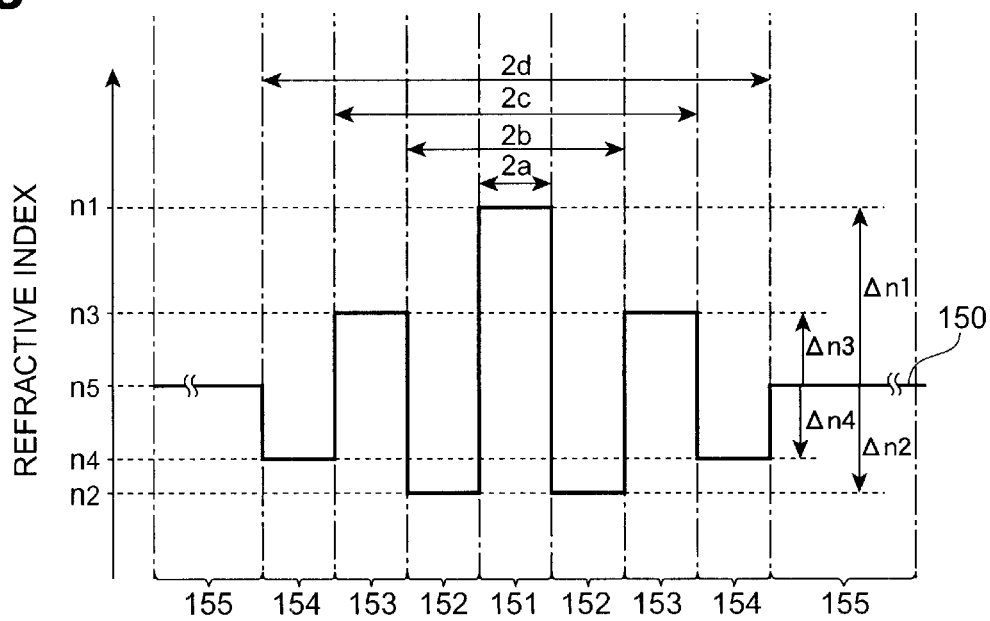
FIG. 4B is a view showing a refractive index profile of the optical fiber shown in FIG. 4A.

Next, the structure of the first and second optical fibers 11 and 12 which can be applied to the optical transmission line 10 of this first embodiment will be described. FIGS. 4A and 4B are views showing a sectional structure common to the first optical fiber 11 and the second optical fiber and its refractive index profile. Incidentally, in FIG. 4A, reference numeral 100 designates an optical fiber corresponding to the first and second optical fibers 11 and 12.

As shown in FIG. 4A, the optical fiber 100 includes a core region 110 extending along a predetermined axis, and a cladding region 120 provided so as to surround the outer periphery of the core region 110. The core region 110 includes a first core 111 having a refractive index n1, a second core 112 provided so as to surround the outer periphery of the first core 111 and having a refractive index n2 (<n1), and a third core 113 provided so as to surround the outer periphery of the second core 112 and having a refractive index n3 (>n2). On the other hand, the cladding region 120 includes an inner cladding 121 provided so as to surround the outer periphery of the third core 113 and having a refractive index n4 (<n3) and an outer cladding 122 provided so as to surround the outer periphery of the inner cladding 121 and having a refractive index n5 (>n4).

When the outer cladding 122 is made a reference region, a relative refractive index difference Δn1 of the first core 111, a relative refractive index difference Δn2 of the second core 112, a relative refractive index difference Δn3 of the third core 113, and a relative refractive index difference Δn4 of the inner cladding 121 are respectively given as follows:

Δn1=(n1−n5)/n5
Δn2=(n2−n5)/n5
Δn3=(n3−n5)/n5
Δn4=(n4−n5)/n5

In this specification, the relative refractive index differences given by the above respective expressions are indicated by the percentage, and the order of parameters in the respective expressions is fixed. Thus, the relative refractive index difference of a region having a refractive index lower than that of the outer cladding 122 as the reference region is indicated by a negative value.

The refractive index profile shown in FIG. 4B indicates the relation between each portion on a line L of the optical fiber 100 shown in FIG. 4A and its refractive index, and in this refractive index profile 150, a region 151 indicates a refractive index of each portion of the first core 111 on the line L, a region 152 indicates a refractive index of each portion of the second core 112 on the line L, a region 153 indicates a refractive index of each portion of the third core 113 on the line L, a region 154 indicates a refractive index of each portion of the inner cladding 121 on the line L, and a region 155 indicates a refractive index of each portion of the outer cladding 122 on the line L.

First Applicative Example

As a specific example of a plurality of optical fibers (dispersion characteristics are different from each other) having the common structure as described above, a first applicative example of the optical transmission line 10 of the first embodiment will be described below.

A first optical fiber of this first applicative example has the sectional structure shown in FIG. 4A, and specifically, an outer diameter 2a of the first core 111 is 6.0 µm, an outer diameter 2b of the second core 112 is 17.5 µm, an outer diameter 2c of the third core 113 is 25.0 µm, and an outer diameter 2d of the inner cladding 121 is 50.0 µm. When the outer cladding 122 is made the reference, the relative refractive index difference Δn1 of the first core 111 is 0.50%, the relative refractive index difference Δn2 of the second core 112 is −0.15%, the relative refractive index difference Δn3 of the third core 113 is 0.27%, and the relative refractive index difference Δn4 of the inner cladding 121 is −0.15%. The optical fiber like this can be obtained by using silica as a base, by adding, for example, Ge elements into the first core 111 and the third core 113, and by adding F elements into the second core 112 and the inner cladding 121.

In the first optical fiber of the first applicative example, the dispersion at the wavelength of 1530 nm is 3.06 ps/nm/km, the dispersion at the wavelength of 1550 nm is 3.15 ps/nm/km, and the dispersion at the wavelength of 1620 nm is 3.20 ps/nm/km. The difference ΔD between the maximum value and the minimum value of the dispersion in the wavelength band of 1530 to 1620 nm is 0.14 ps/nm/km. At the wavelength of 1550 nm, the effective area is 47.4 µm², and a mode field diameter is 7.80 µm. When it is wound one turn at a diameter of 32 mm, the bending loss at the wavelength of 1550 nm is 0.2 dB/turn, and the bending loss at the wavelength of 1620 nm is 1.4 dB/turn. A cut-off wavelength (cut-off wavelength of an LP11-mode in the state where an optical fiber of a length of 2 m is wound only one turn at a radius of 140 mm) is 1.56 µm.

On the other hand, a second optical fiber of the first applicative example has also the sectional structure shown in FIG. 4A, and specifically, the outer diameter 2a of the first core 111 is 5.7 µm, the outer diameter 2b of the second core 112 is 16.7 µm, the outer diameter 2c of the third core 113 is 23.8 µm, and the outer diameter 2d of the inner cladding 121 is 47.6 µm. When the outer cladding 122 is made the reference, the relative refractive index difference Δn1 of the first core 111 is 0.50%, the relative refractive index difference Δn2 of the second core 112 is −0.15%, the relative refractive index difference Δn3 of the third core 113 is 0.27%, and the relative refractive index difference Δn4 of the inner cladding 121 is −0.15%. The optical fiber like this can be obtained by using silica as a base, by adding, for example, Ge elements into the first core 111 and the third core 113, and by adding F elements into the second core 112 and the inner cladding 121.

In the second optical fiber of the first applicative example, the dispersion at the wavelength of 1530 nm is −3.02 ps/nm/km, the dispersion at the wavelength of 1550 nm is −3.04 ps/nm/km, and the dispersion at the wavelength of 1620 nm is −2.44 ps/nm/km. The difference ΔD between the maximum value and the minimum value of the dispersion in the wavelength band of 1530 to 1620 nm is 0.60 ps/nm/km. At the wavelength of 1550 nm, the effective area is 50.3 µm², and the mode field diameter is 8.00 µm. When it is wound one turn at a diameter of 32 mm, the bending loss at the wavelength of 1550 nm is 1.2 dB/turn, and the bending loss at the wavelength of 1620 nm is 5.7 dB/turn. The cut-off wavelength is 1.44 µm.

Figure 5:
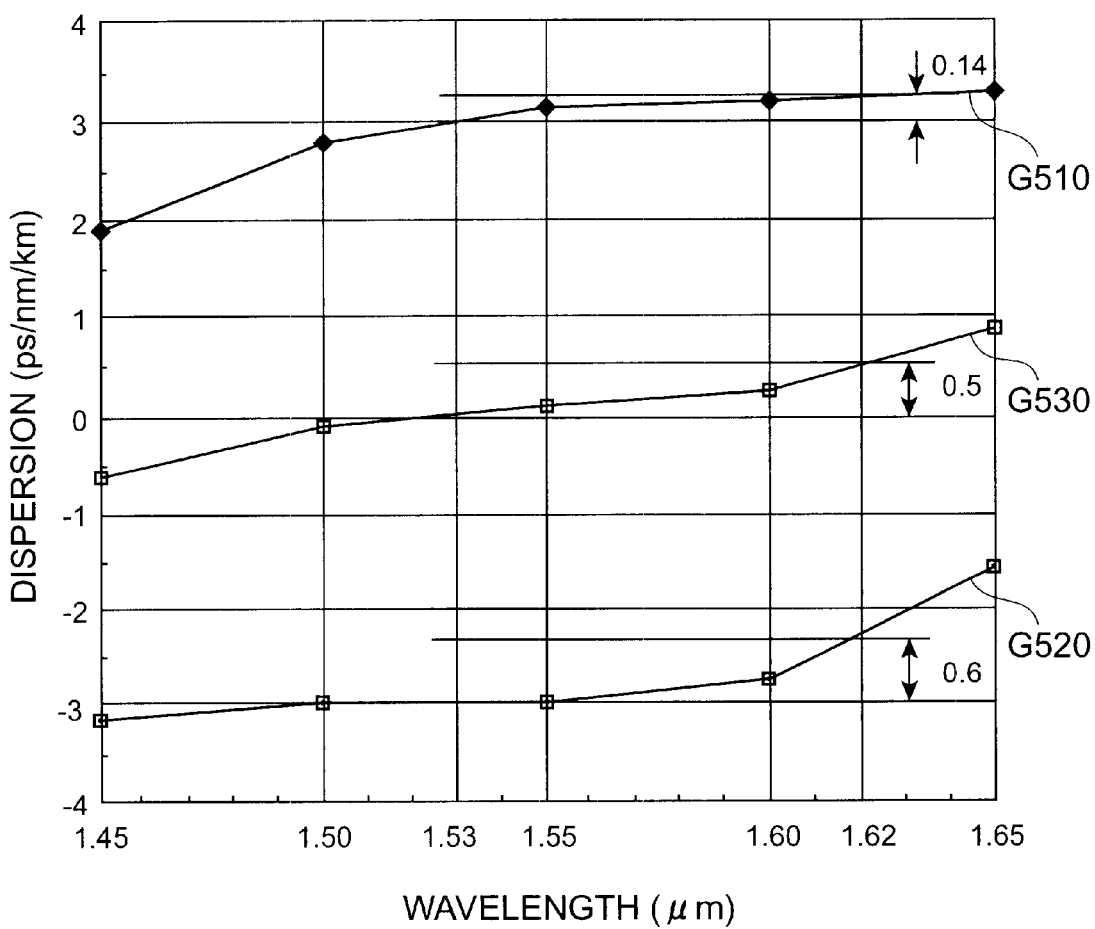
FIG. 5 is a graph showing dispersion characteristics of the whole optical transmission line and dispersion characteristics of each of two kinds of optical fibers constituting the optical transmission line in a first applicative example of the first embodiment.

FIG. 5 is a graph showing dispersion characteristics of the whole optical transmission line of the first applicative example and dispersion characteristics of each of the first and second optical fibers. Incidentally, a graph G510 in the drawing indicates the dispersion characteristics of the first optical fiber of the first applicative example in the wavelength band of 1530 to 1620 nm, a graph G520 indicates the dispersion characteristics of the second optical fiber of the first applicative example in the wavelength band of 1530 to 1620 nm, and a graph G530 indicates the dispersion characteristics of the whole optical transmission line of the first applicative example in the wavelength band of 1530 to 1620 nm. Besides, in this first applicative example, fiber lengths of the first and second optical fibers are equal to each other, and in the whole optical transmission line of the first applicative example, the difference ΔD between the maximum value and the minimum value of the dispersion is about 0.5 ps/nm/km in the wavelength band of 1530 to 1620 nm.

Incidentally, in the optical transmission line of the first embodiment, various modifications can be made in addition to the foregoing first applicative example. For example, FIG. 6 is a table showing structural parameters and optical characteristics of a first optical fiber and a second optical fiber as respective structural elements of second to fifth applicative examples together with the foregoing first applicative example.

Second Applicative Example

A first optical fiber applied to an optical transmission line of a second applicative example has also the sectional structure shown in FIG. 4A, and specifically, the outer diameter 2a of the first core 111 is 6.2 µm, the outer diameter 2b of the second core 112 is 16.7 µm, the outer diameter 2c of the third core 113 is 24.6 µm, and the outer diameter 2d of the inner cladding 121 is 49.2 µm. When the outer cladding 122 is made the reference, the relative refractive index difference Δn1 of the first core 111 is 0.55%, the relative refractive index difference Δn2 of the second core 112 is −0.15%, the relative refractive index difference Δn3 of the third core 113 is 0.27%, and the relative refractive index difference Δn4 of the inner cladding 121 is −0.15%.

Further, in the first optical fiber of the second applicative example, the dispersion at the wavelength of 1530 nm is 6.52 ps/nm/km, the dispersion at the wavelength of 1550 nm is 6.86 ps/nm/km, and the dispersion at the wavelength of 1620 nm is 7.62 ps/nm/km. The difference ΔD between the maximum value and the minimum value of the dispersion in the wavelength band of 1530 to 1620 nm is 1.10 ps/nm/km. At the wavelength of 1550 nm, the effective area is 44.0 $\mu m^2$, and the mode field diameter is 7.79 $\mu m$. When it is wound one turn at a diameter of 32 mm, the bending loss at the wavelength of 1550 nm is 0.002 dB/turn, and the bending loss at the wavelength of 1620 nm is 0.02 dB/turn. A cut-off wavelength (cut-off wavelength of an LP11-mode in the state where an optical fiber of a length of 2 m is wound only one turn at a radius of 140 mm) is 1.69 $\mu m$.

On the other hand, a second optical fiber applied to the optical transmission line of the second applicative example has also the sectional structure shown in FIG. 4A, and specifically, the outer diameter 2a of the first core 111 is 5.6 $\mu m$, the outer diameter 2b of the second core 112 is 14.7 $\mu m$, the outer diameter 2c of the third core 113 is 22.3 $\mu m$, and the outer diameter 2d of the inner cladding 121 is 44.6 $\mu m$. When the outer cladding 122 is made the reference, the relative refractive index difference $\Delta n1$ of the first core 111 is 0.57%, the relative refractive index difference $\Delta n2$ of the second core 112 is −0.15%, the relative refractive index difference $\Delta n3$ of the third core 113 is 0.30%, and the relative refractive index difference $\Delta n4$ of the inner cladding 121 is −0.15%.

Further, in the second optical fiber of the second applicative example, the dispersion at the wavelength of 1530 nm is −6.89 ps/nm/km, the dispersion at the wavelength of 1550 nm is −6.78 ps/nm/km, and the dispersion at the wavelength of 1620 nm is −5.14 ps/nm/km. The difference $\Delta D$ between the maximum value and the minimum value of the dispersion in the wavelength band of 1530 to 1620 nm is 1.75 ps/nm/km. At the wavelength of 1550 nm, the effective area is 48.6 $\mu m^2$, and the mode field diameter is 7.76 $\mu m$. When it is wound one turn at a diameter of 32 mm, the bending loss at the wavelength of 1550 nm is 0.02 dB/turn, and the bending loss at the wavelength of 1620 nm is 0.2 dB/turn. The cut-off wavelength is 1.70 $\mu m$.

Figure 7:
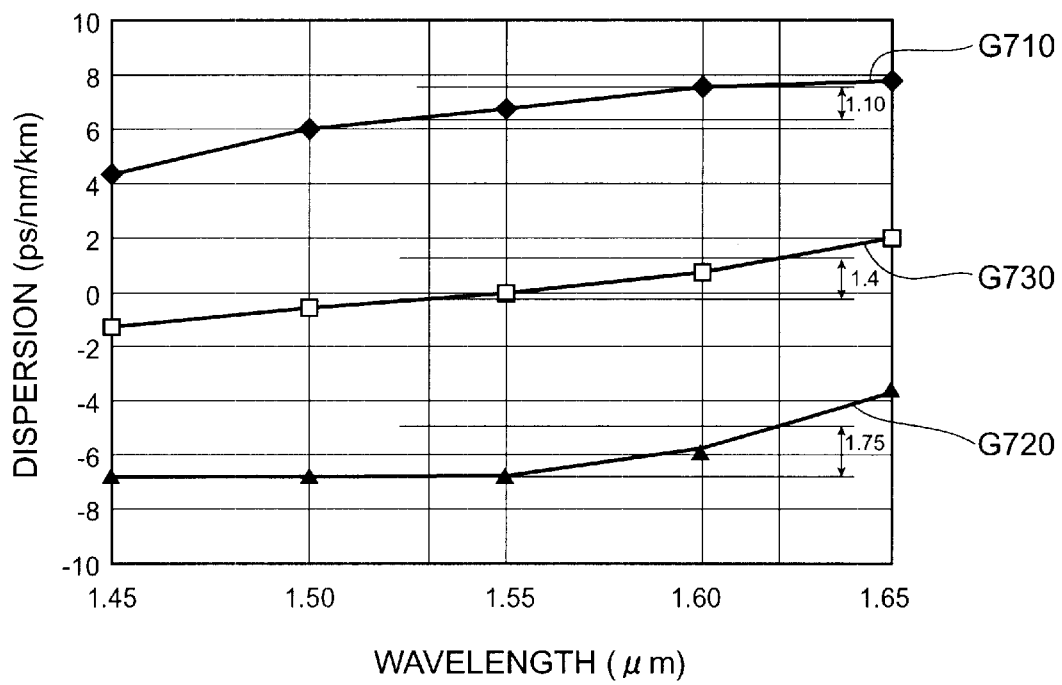
FIG. 7 is a graph showing dispersion characteristic of the whole optical transmission line and dispersion characteristics of two kinds of optical fibers constituting the optical transmission line in the second applicative example of the first embodiment.

FIG. 7 is a graph showing dispersion characteristics of the whole optical transmission line of the second applicative example and the dispersion characteristics of each of the first and second optical fibers. Incidentally, a graph G710 in the drawing indicates the dispersion characteristics of the first optical fiber of the second applicative example in the wavelength band of 1530 to 1620 nm, a graph G720 indicates the dispersion characteristics of the second optical fiber of the second applicative example in the wavelength band of 1530 to 1620 nm, and a graph G730 indicates the dispersion characteristics of the whole optical transmission line of the second applicative example in the wavelength band of 1530 to 1620 nm. In this second applicative example, fiber lengths of the first and second optical fibers are equal to each other, and in the whole optical transmission line of the second applicative example, the difference $\Delta D$ between the maximum value and the minimum value of the dispersion is about 1.4 ps/nm/km in the wavelength band of 1530 to 1620 nm.

Third Applicative Example

A first optical fiber applied to an optical transmission line of a third applicative example has also the sectional structure shown in FIG. 4A, and specifically, the outer diameter 2a of the first core 111 is 6.3 $\mu m$, the outer diameter 2b of the second core 112 is 16.6 $\mu m$, the outer diameter 2c of the third core 113 is 25.2 $\mu m$, and the outer diameter 2d of the inner cladding 121 is 50.4 $\mu m$. When the outer cladding 122 is made the reference, the relative refractive index difference $\Delta n1$ of the first core 111 is 0.53%, the relative refractive index difference $\Delta n2$ of the second core 112 is −0.15%, the relative refractive index difference $\Delta n3$ of the third core 113 is 0.30%, and the relative refractive index difference $\Delta n4$ of the inner cladding 121 is −0.15%.

Further, in the first optical fiber of the third applicative example, the dispersion at the wavelength of 1530 nm is 3.81 ps/nm/km, the dispersion at the wavelength of 1550 nm is 3.82 ps/nm/km, and the dispersion at the wavelength of 1620 nm is 3.58 ps/nm/km. The difference $\Delta D$ between the maximum value and the minimum value of the dispersion in the wavelength band of 1530 to 1620 nm is 0.23 ps/nm/km. At the wavelength of 1550 nm, the effective area is 47.8 $\mu m^2$, and the mode field diameter is 7.77 $\mu m$. When it is wound one turn at a diameter of 32 mm, the bending loss at the wavelength of 1550 nm is 0.004 dB/turn, and the bending loss at the wavelength of 1620 nm is 0.03 dB/turn. A cut-off wavelength (cut-off wavelength of an LP11-mode in the state where an optical fiber of a length 2 m is wound only one turn at a radius of 140 mm) is 1.91 $\mu m$.

On the other hand, a second optical fiber applied to the optical transmission line of the third applicative example has also the sectional structure shown in FIG. 4A, and specifically, the outer diameter 2a of the first core 111 is 6.0 $\mu m$, the outer diameter 2b of the second core 112 is 15.7 $\mu m$, the outer diameter 2c of the third core 113 is 23.8 $\mu m$, and the outer diameter 2d of the inner cladding 121 is 47.6 $\mu m$. When the outer cladding 122 is made the reference, the relative refractive index difference $\Delta n1$ of the first core 111 is 0.53%, the relative refractive index difference $\Delta n2$ of the second core 112 is −0.15%, the relative refractive index difference $\Delta n3$ of the third core 113 is 0.30%, and the relative refractive index difference $\Delta n4$ of the inner cladding 121 is −0.15%.

Further, in the second optical fiber of the third applicative example, the dispersion at the wavelength of 1530 nm is −3.68 ps/nm/km, the dispersion at the wavelength of 1550 nm is −3.75 ps/nm/km, and the dispersion at the wavelength of 1620 nm is −3.02 ps/nm/km. The difference $\Delta D$ between the maximum value and the minimum value of the dispersion in the wavelength band of 1530 to 1620 nm is 0.73 ps/nm/km. At the wavelength of 1550 nm, the effective area is 51.3 $\mu m^2$, and the mode field diameter is 7.95 $\mu m$. When it is wound one turn at a diameter of 32 mm, the bending loss at the wavelength of 1550 nm is 0.04 dB/turn, and the bending loss at the wavelength of 1620 nm is 0.3 dB/turn. The cut-off wavelength is 1.80 $\mu m$.

Figure 8:
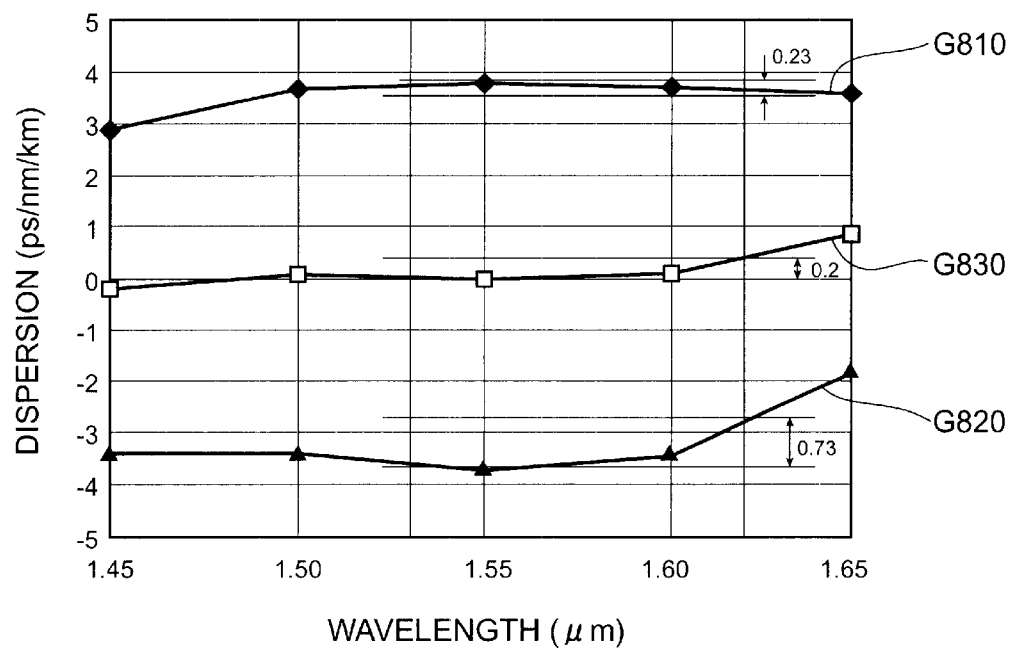
FIG. 8 is a graph showing dispersion characteristic of the whole optical transmission line and dispersion characteristics of two kinds of optical fibers constituting the optical transmission line in the third applicative example of the first embodiment.

FIG. 8 is a graph showing dispersion characteristics of the whole optical transmission line of the third applicative example and dispersion characteristics of each of the first and second optical fibers. Incidentally, a graph G810 in the drawing indicates the dispersion characteristics of the first optical fiber of the third applicative example in the wavelength band of 1530 to 1620 nm, a graph G820 indicates the dispersion characteristics of the second optical fiber of the third applicative example in the wavelength band of 1530 to 1620 nm, and a graph G830 indicates the dispersion characteristics of the whole optical transmission line of the third applicative example in the wavelength band of 1530 to 1620 nm. In this third applicative example, fiber lengths of the first and second optical fibers are equal to each other, and in the whole optical transmission line of the third applicative example, the difference $\Delta D$ between the maximum value and the minimum value of the dispersion is about 0.2 ps/nm/km in the wavelength band of 1530 to 1620 nm.

Fourth Applicative Example

A first optical fiber applied to an optical transmission line of a fourth applicative example has also the sectional structure shown in FIG. 4A, and specifically, the outer diameter 2a of the first core 111 is 6.9 μm, the outer diameter 2b of the second core 112 is 17.6 μm, the outer diameter 2c of the third core 113 is 26.6 μm, and the outer diameter 2d of the inner cladding 121 is 53.2 μm. When the outer cladding 122 is made the reference, the relative refractive index difference Δn1 of the first core 111 is 0.49%, the relative refractive index difference Δn2 of the second core 112 is −0.15%, the relative refractive index difference Δn3 of the third core 113 is 0.32%, and the relative refractive index difference Δn4 of the inner cladding 121 is −0.15%.

Further, in the first optical fiber of the fourth applicative example, the dispersion at the wavelength of 1530 nm is 3.50 ps/nm/km, the dispersion at the wavelength of 1550 nm is 3.34 ps/nm/km, and the dispersion at the wavelength of 1620 nm is 3.00 ps/nm/km. The difference ΔD between the maximum value and the minimum value of the dispersion in the wavelength band of 1530 to 1620 nm is 0.50 ps/nm/km. At the wavelength 1550 nm, the effective area is 56.5 μm², and the mode field diameter is 8.29 μm. When it is wound one turn at a diameter of 32 mm, the bending loss at the wavelength of 1550 nm is 0.003 dB/turn, and the bending loss at the wavelength of 1620 nm is 0.02 dB/turn. A cut-off wavelength (cut-off wavelength of an LP11-mode in the state where an optical fiber of a length 2 m is wound only one turn at a radius of 140 mm) is 2.19 μm.

On the other hand, a second optical fiber applied to the optical transmission line of the fourth applicative example has also the sectional structure shown in FIG. 4A, and specifically, the outer diameter 2a of the first core 111 is 6.6 μm, the outer diameter 2b of the second core 112 is 16.7 μm, the outer diameter 2c of the third core 113 is 25.3 μm, and the outer diameter 2d of the inner cladding 121 is 50.6 μm. When the outer cladding 122 is made the reference, the relative refractive index difference Δn1 of the first core 111 is 0.49%, the relative refractive index difference Δn2 of the second core 112 is −0.15%, the relative refractive index difference Δn3 of the third core 113 is 0.32%, and the relative refractive index difference Δn4 of the inner cladding 121 is −0.15%.

Further, in the second optical fiber of the fourth applicative example, the dispersion at the wavelength of 1530 nm is −3.36 ps/nm/km, the dispersion at the wavelength of 1550 nm is −3.33 ps/nm/km, and the dispersion at the wavelength of 1620 nm is −1.39 ps/nm/km. The difference ΔD between the maximum value and the minimum value of the dispersion in wavelength band of 1530 to 1620 nm is 1.94 ps/nm/km. At the wavelength of 1550 nm, the effective area is 62.7 μm², and the mode field diameter is 8.51 μm. When it is wound one turn at a diameter of 32 mm, the bending loss at the wavelength of 1550 nm is 0.02 dB/turn, and the bending loss at the wavelength of 1620 nm is 0.1 dB/turn. The cut-off wavelength is 2.07 μm.

Figure 9:
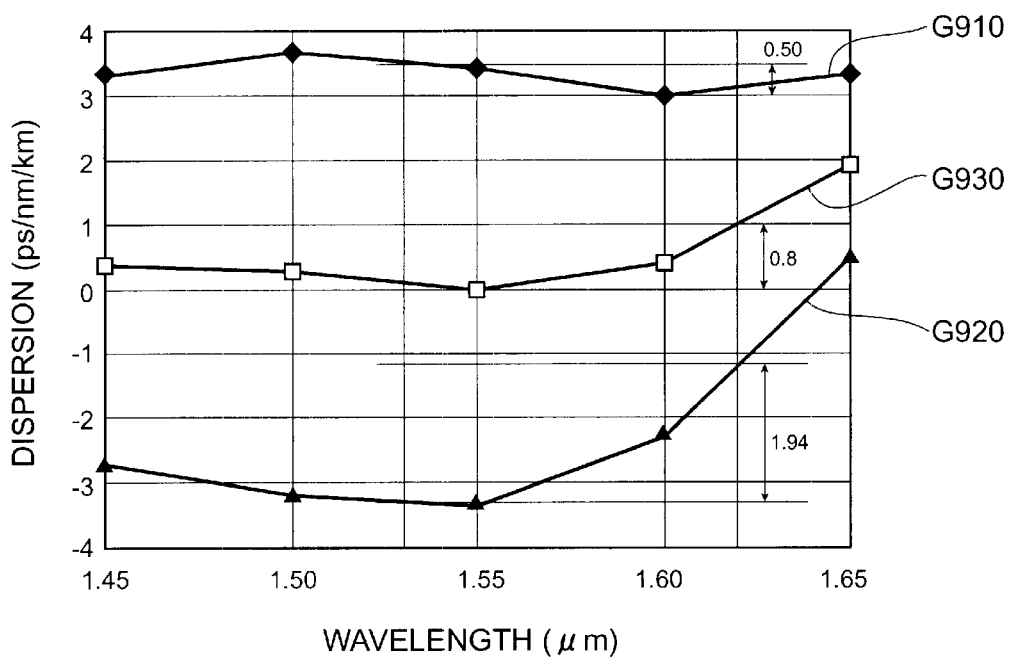
FIG. 9 is a graph showing dispersion characteristic of the whole optical transmission line and dispersion characteristics of two kinds of optical fibers constituting the optical transmission line in the fourth applicative example of the first embodiment.

FIG. 9 is a graph showing dispersion characteristics of the whole optical transmission line of the fourth applicative example and dispersion characteristics of each of the first and second optical fibers. Incidentally, a graph G910 in the drawing indicates the dispersion characteristics of the first optical fiber of the fourth applicative example in the wavelength band of 1530 to 1620 nm, a graph G920 indicates the dispersion characteristics of the second optical fiber of the fourth applicative example in the wavelength band of 1530 to 1620 nm, and a graph G930 indicates the dispersion characteristics of the whole optical transmission line of the fourth applicative example in the wavelength band of 1530 to 1620 nm. In this fourth applicative example, fiber lengths of the first and second optical fibers are equal to each other, and in the whole optical transmission line of the fourth applicative example, the difference ΔD between the maximum value and the minimum value of the dispersion is about 0.8 ps/nm/km in the wavelength band of 1530 to 1620 nm.

Fifth Applicative Example

A first optical fiber applied to an optical transmission line of a fifth applicative example has also the sectional structure shown in FIG. 4A, and specifically, the outer diameter 2a of the first core 111 is 6.1 μm, the outer diameter 2b of the second core 112 is 15.1 μm, the outer diameter 2c of the third core 113 is 24.3 μm, and the outer diameter 2d of the inner cladding 121 is 48.6 μm. When the outer cladding 122 is made the reference, the relative refractive index difference Δn1 of the first core 111 is 0.58%, the relative refractive index difference Δn2 of the second core 112 is −0.18%, the relative refractive index difference Δn3 of the third core 113 is 0.25%, and the relative refractive index difference Δn4 of the inner cladding 121 is −0.18%.

Further, in the first optical fiber of the fifth applicative example, the dispersion at the wavelength of 1530 nm is 5.71 ps/nm/km, the dispersion at the wavelength of 1550 nm is 5.96 ps/nm/km, and the dispersion at the wavelength of 1620 nm is 6.44 ps/nm/km. The difference ΔD between the maximum value and the minimum value of the dispersion in the wavelength band of 1530 to 1620 nm is 0.73 ps/nm/km. At the wavelength of 1550 nm, the effective area is 41.6 μm², and the mode field diameter is 7.30 μm. When it is wound one turn at a diameter of 32 mm, the bending loss at the wavelength of 1550 nm is 0.0003 dB/turn, and the bending loss at the wavelength of 1620 nm is 0.005 dB/turn. A cut-off wavelength (cut-off wavelength of an LP11-mode in the state where an optical fiber of a length of 2 m is wound only one turn at a radius of 140 mm) is 1.69 μm.

On the other hand, a second optical fiber applied to the optical transmission line of the fifth applicative example has also the sectional structure shown in FIG. 4A, and specifically, the outer diameter 2a of the first core 111 is 5.5 μm, the outer diameter 2b of the second core 112 is 13.6 μm, the outer diameter 2c of the third core 113 is 22.0 μm, and the outer diameter 2d of the inner cladding 121 is 44.0 μm. When the outer cladding 122 is made the reference, the relative refractive index difference Δn1 of the first core 111 is 0.58%, the relative refractive index difference Δn2 of the second core 112 is −0.18%, the relative refractive index difference Δn3 of the third core 113 is 0.25%, and the relative refractive index difference Δn4 of the inner cladding 121 is −0.18%.

Further, in the fifth optical fiber of the second applicative example, the dispersion at the wavelength of 1530 nm is −6.00 ps/nm/km, the dispersion at the wavelength of 1550 nm is −5.91 ps/nm/km, and the dispersion at the wavelength of 1620 nm is −4.71 ps/nm/km. The difference ΔD between the maximum value and the minimum value of the dispersion in the wavelength band of 1530 to 1620 nm is 1.29 ps/nm/km. At the wavelength of 1550 nm, the effective area is 44.8 μm², and the mode field diameter is 7.51 μm. When it is wound one turn at a diameter of 32 mm, the bending loss at the wavelength of 1550 nm is 0.04 dB/turn, and the bending loss at the wavelength of 1620 nm is 0.3 dB/turn. The cut-off wavelength is 1.53 μm.

Figure 10:
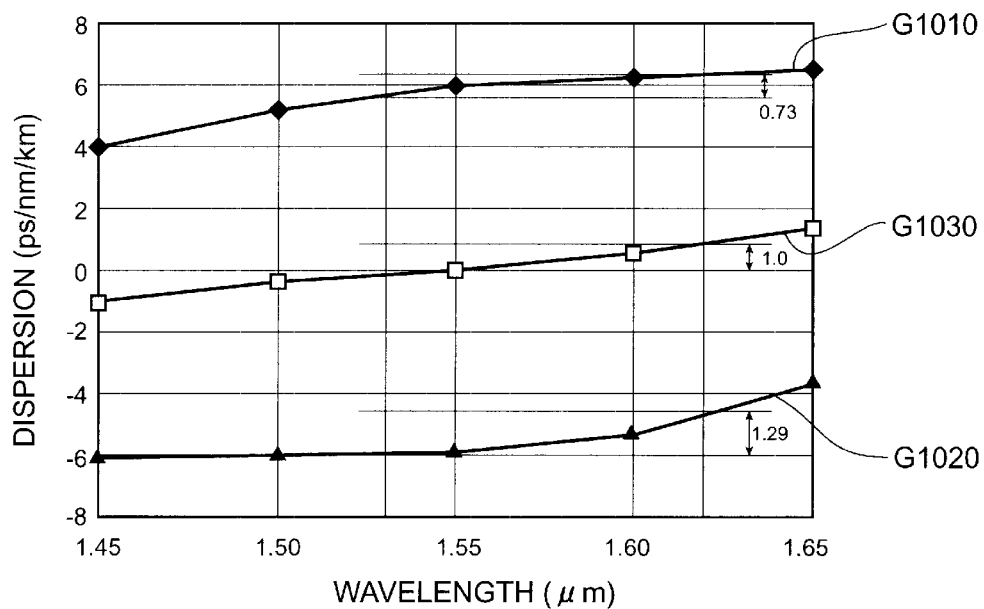
FIG. 10 is a graph showing dispersion characteristic of the whole optical transmission line and dispersion characteristics of two kinds of optical fibers constituting the optical transmission line in the fifth applicative example of the first embodiment.

FIG. 10 is a graph showing dispersion characteristics of the whole optical transmission line of the fifth applicative example and dispersion characteristics of each of the first and second optical fibers. Incidentally, a graph G1010 in the drawing indicates the dispersion characteristics of the first optical fiber of the fifth applicative example in the wavelength band of 1530 to 1620 nm, a graph G1020 indicates the dispersion characteristics of the second optical fiber of the fifth applicative example in the wavelength band of 1530 to 1620 nm, and a graph G1030 indicates the dispersion characteristics of the whole optical transmission line of the fifth applicative example in the wavelength band of 1530 to 1620 nm. In this fifth applicative example, fiber lengths of the first and second optical fibers are equal to each other, and in the whole optical transmission line of the fifth applicative example, the difference ΔD between the maximum value and the minimum value of the dispersion is about 1.0 ps/nm/km in the wavelength band of 1530 to 1620 nm.

Incidentally, as an aspect of an optical fiber applicable to the optical transmission line of each of the foregoing applicative examples, in the wavelength band of 1530 to 1620 nm, an optical fiber may have a dispersion in which its absolute value is 1.0 to 8.0 ps/nm/km and a difference between its maximum value and its minimum value is 3.0 ps/nm/km or less, preferably 2.0 ps/nm/km or less, and have a bending loss of 0.5 dB or less at the wavelength of 1620 nm when it is wound one turn at a diameter of 32 mm. Incidentally, it is preferable that the optical fiber of this aspect has also an effective area of 40 $\mu m^2$ or more at the wavelength of 1550 nm. As another aspect, for the purpose of suppressing the increase of the bending loss, in the wavelength band of 1530 to 1620 nm, an optical fiber may have a dispersion in which its absolute value is 1.0 to 8.0 ps/nm/km and a difference between its maximum value and its minimum value is 3.0 ps/nm/km or less, preferably 2.0 ps/nm/km or less, and have an effective area of less than 60 $\mu m^2$ at the wavelength of 1550 nm. Incidentally, the optical fiber of this aspect has an effective area of 40 $\mu m^2$ or more at the wavelength of 1550 nm.

Second Embodiment

Figure 11:
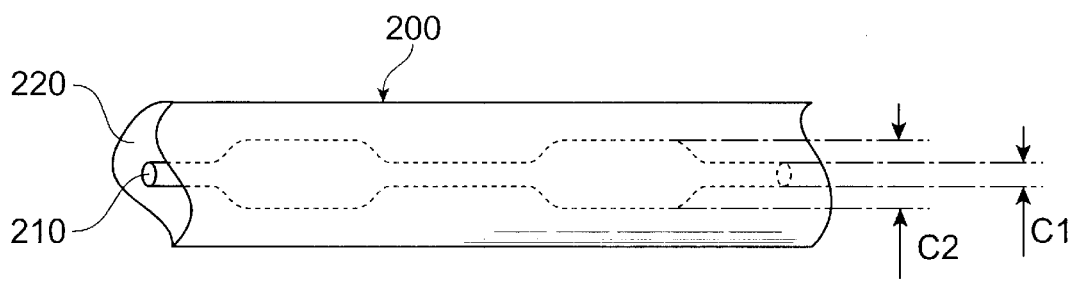
FIG. 11 is a view showing a structure of an optical fiber which can be applied to a second embodiment of an optical transmission line of the present invention.

Next, a second embodiment of an optical transmission line according to the present invention will be described. FIG. 11 is a view for explaining the structure of an optical fiber applicable to the optical transmission line of the second embodiment. An optical fiber 200 includes a core region 210 extending along a predetermined axis and a cladding region 220 provided so as to surround the outer periphery of the core region 210, and has the sectional structure and the refractive index profile shown in FIGS. 4A and 4B. Specifically, this optical fiber 200 is a unitary optical fiber characterized in that the outer diameter of the core region 210 is changed along the longitudinal direction, and specifically, core diameters are different from each other by 2% or more between an outer diameter c2 of a portion having a relatively small core diameter and an outer diameter c2 of a portion having a relatively large core diameter.

FIGS. 12A and 12B are views showing the structure and dispersion characteristics of an optical fiber applicable to a first applicative example of the optical transmission line of this second embodiment. An optical fiber 40 of this first applicative example is a unitary optical fiber including no connection point as shown in FIG. 12B, and includes a portion $42_1$, a portion $41_1$, a portion $42_2$, a portion $41_2$, a portion $42_3$, a portion $41_3$, . . . sequentially from one end portion. Among these, the portion $41_n$ (n=1, 2, 3, . . . ) has a dispersion of +1.0 to +8.0 ps/nm/km in the wavelength band of 1530 to 1620 nm as shown in FIG. 12A, and a difference between a maximum value and a minimum value of the dispersion is 3.0 ps/nm/km or less, preferably 2.0 ps/nm/km or less. The portion $42_n$ (n=1, 2, 3, . . . ) has a dispersion of −1.0 to −8.0 ps/nm/km in the wavelength band of 1530 to 1620 nm as shown in FIG. 12A, and a difference between a maximum value and a minimum value of the dispersion is 3.0 ps/nm/km or less, preferably 2.0 ps/nm/km or less. Incidentally, an outer diameter of the portion $41_n$ and an outer diameter of the portion $42_n$ are different from each other by 2% or more. Since the dispersion of each of the portions $41_n$ and $42_n$ in the wavelength band of 1530 to 1620 nm is not zero, this optical fiber 40 can effectively suppress the occurrence of four-wave mixing.

Specifically, the optical fiber 40 is designed on the basis of the following elements. That is, it has the sectional structure and the refractive index profile shown in FIGS. 4A and 4B, and ratios among the outer diameter 2a of the first core 111, the outer diameter 2b of the second core 112, the outer diameter 2c of the third core 113, and the outer diameter 2d of the inner cladding 121 are set as follow:

2a/2c=0.24
2b/2c=0.70
2d/2c=2.0

Further, when the outer cladding 122 is made a reference region, the relative refractive index difference Δn1 of the first core 111 is 0.50%, the relative refractive index difference Δn2 of the second core 112 is −0.15%, the relative refractive index difference Δn3 of the third core 113 is 0.27%, and the relative refractive index difference Δn4 of the inner cladding 121 is −0.15%. The length of each of the portions $41_n$ and $42_n$ is made 5 km.

If the outer diameter 2c of the third core 113 is made 23.8 $\mu$m under the above condition, a portion having dispersion characteristics (dispersion at the wavelength of 1550 nm is −3.04 ps/nm/km) similar to the second optical fiber 12 applicable to the optical transmission line of the first embodiment can be designed, and this portion corresponds to the portion $42_n$ in the optical fiber 40. On the other hand, if the outer diameter 2c of the third core 113 is increased by 5% and is made 25.0 $\mu$m, a portion having dispersion characteristics (dispersion at the wavelength of 1550 nm is 3.15 ps/nm/km) similar to the first optical fiber 11 applicable to the optical transmission line of the first embodiment can be obtained, and this portion corresponds to the portion $41_n$ of the optical fiber 40. The optical fiber 40 of the first applicative example like this can be easily obtained by preparing an optical fiber parent material in which a relative refractive index distribution and an outer diameter of each portion are constant in the longitudinal direction, by adjusting (for example, changing of wire drawing tension) a fiber diameter in the longitudinal direction when this optical fiber parent material is drawn, and the like.

Incidentally, the above first-to third cores 111 to 113 are included in the above core region 210, and the above inner cladding 121 and the outer cladding 122 are included in the above cladding region 220.

Further, FIGS. 13A and 13B are views showing the structure and dispersion characteristics of an optical fiber applicable to a second applicative example of the optical transmission line of this second embodiment. An optical fiber 50 of this second applicative example is a unitary optical fiber including no connection point as shown in FIG. 13B, and includes a portion $52_1$, a portion $51_1$, a portion $52_2$, a portion $51_2$, . . . sequentially from one end portion. Among these, the portion $51_n$ (n=1, 2, . . . ) has a dispersion of +1.0 to +8.0 ps/nm/km in the wavelength band of 1530 to 1620 nm as shown in FIG. 13A, and a difference between a maximum value and a minimum value of the dispersion is 3.0 ps/nm/km or less, preferably 2.0 ps/nm/km or less. The portion $52_n$ (n=1, 2, . . . ) has a dispersion of −1.0 to −8.0 ps/nm/km in the wavelength band of 1530 to 1620 nm as shown in FIG. 13B, and a difference between a maximum value and a minimum value of the dispersion is 3.0 ps/nm/km or less, preferably 2.0 ps/nm/km or less. Incidentally, an outer diameter of the portion $51_n$ and an outer diameter of the portion $52_n$ are different from each other by 2% or more. Since the dispersion of each of the portions $51_n$ and $52_n$ in the wavelength band of 1530 to 1620 nm is not zero, this optical fiber 50 can effectively suppress the occurrence of four-wave mixing.

The optical fiber 50 of this second applicative example is different from the first applicative example in that the respective portions $51_n$ and $52_n$ have different values in the length and dispersion. Specifically, it may be set such that the length of the portion $52_1$ is 3 km, the length of the portion $51_1$ is 5 km, the length of the portion $52_2$ is 5 km, and the length of the portion $51_2$ is 3 km (the length of each of the portions may not be necessarily constant). Besides, the dispersion of the portion $51_n$ may not be constant, for example, the dispersion in the portion $51_1$ is about 2.2 ps/nm/km, and the dispersion in the portion $51_2$ is about 3.4 ps/nm/km. Further, the dispersion of the portion $52_n$ may not be constant, for example, the dispersion in the portion $52_1$ is about −2.1 ps/nm/km, and the dispersion in the portion $52_2$ is about −3.5 ps/nm/km. Incidentally, the change of the dispersion at a boundary between adjacent portions, that is, the change of the fiber structure may not be steep.

As described above, each of the optical fiber 40 (first applicative example) and the optical fiber 50 (second applicative example) applied to the optical transmission line of the second embodiment is the unitary fiber subjected to dispersion-managed. Thus, when the optical transmission line is constituted by fusing and connecting a plurality of optical fibers, it is not necessary to consider the dispersion of each of the optical fibers, and a structure suitable for long-haul transmission of a WDM signal in the wavelength band of 1530 to 1620 nm can be easily obtained. In addition, in the optical transmission line of this second embodiment, since the dispersion occurs (dispersion is not zero) in most of the wavelength band of 1530 to 1620 nm, the occurrence of four-wave mixing can be effectively suppressed. Besides, since the difference between the maximum value and the minimum value of the dispersion in the wavelength band of 1530 to 1620 nm is small, the optical transmission line of the second embodiment enables the long-haul transmission of the WDM signal in the wavelength band of the wavelength 1530 to 1620 nm.

Further, in the optical transmission line in which the plurality of optical fibers 40 and 50 are fused and connected, it is preferable that a difference ΔD between a maximum value and a minimum value of an average dispersion in the wavelength band of 1530 to 1620 nm is 2.0 ps/nm/km or less, preferably 1.0 ps/nm/km or less, more preferably 0.5 ps/nm/km or less. For example, in the wavelength band of 1530 to 1620 nm, when the difference ΔD between the maximum value and the minimum value of the average dispersion value of the optical transmission line is 2.0 ps/nm/km or less, an optical signal of a bit rate of 10 Gb/s can be transmitted over a distance of about 1000 km, and an optical signal of a bit rate of 20 Gb/s can be transmitted over a distance of about 250 km.

Besides, in the wavelength band of 1530 to 1620 nm, when the difference ΔD between the maximum value and the minimum value of the average dispersion value of the optical transmission line is 1.0 ps/nm/km or less, an optical signal of a bit rate of 10 Gb/s can be transmitted over a distance of about 2000 km, and an optical signal of a bit rate of 20 Gb/s can be transmitted over a distance of about 500 km.

Incidentally, also in the optical fiber of the second embodiment, it is preferable that the bending loss at the wavelength of 1620 nm is 0.5 dB or less when it is wound one turn at a diameter of 32 mm, and the effective area at the wavelength of 1550 nm is 40 $\mu m^2$ or more.

Further, also in the optical transmission line of the second embodiment, various modifications can be made. For example, the optical fiber applied to the optical transmission line may be one having the foregoing refractive index profile (see FIG. 4B) and different parameters, or having another refractive index profile. Besides, the number of optical fibers constituting the optical transmission line is arbitrary.

As described above, the optical transmission line of the present invention is constituted by fusing and connecting the first and second optical fibers having different dispersion characteristics in the wavelength band of 1530 to 1620 nm coincident with the amplification wavelength band for optical amplification, or by the unitary optical fiber having the first and second portions with different core diameters so as to intentionally change the dispersion characteristics in the wavelength band. Particularly, the first optical fiber or the first portion has the dispersion of +1.0 to +8.0 ps/nm/km in the wavelength band, and the difference between the maximum value and the minimum value of the diffusion is 3.0 ps/nm/km or less, preferably 2.0 ps/nm/km or less. The second optical fiber or the second portion has the dispersion of −1.0 to −8.0 ps/nm/km in the wavelength band, and the difference between the maximum value and the minimum value of the diffusion is 3.0 ps/nm/km or less, preferably 2.0 ps/nm/km or less. In the optical transmission line constituted by such optical fibers or parts having different dispersion characteristics, the difference between the maximum value and the minimum value of the average dispersion value in the wavelength band is 2.0 ps/nm/km or less; preferably 1.0 ps/nm/km or less, more preferably 0.5 ps/nm/km or less. Thus, in the respective optical fibers or parts, since a zero-dispersion wavelength does not exist in the wavelength band, the occurrence of four-wave mixing can be effectively suppressed, and waveform deterioration of an optical signal due to the dispersion can also be sufficiently suppressed. As a result, in the wavelength band of 1530 to 1620 nm, long-haul transmission of the WDM signal (including optical signals having wavelengths different from each other) becomes possible.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission line, comprising:
   one or more first optical fibers each having a dispersion of +1.0 to +8.0 ps/nm/km in a wavelength band of 1530 to 1620 nm and a difference of 3.0 ps/nm/km or less between a maximum value and a minimum value of the dispersion thereof; and
   one or more second optical fibers each having a dispersion of −1.0 to −8.0 ps/nm/km in the wavelength band and a difference of 3.0 ps/nm/km or less between a maximum value and a minimum value of the dispersion thereof,
   wherein, in the wavelength band, a difference between a maximum value and a minimum value of an average dispersion value obtained from each fiber length and each dispersion value of said first and second optical fibers is 2.0 ps/nm/km or less.

2. An optical transmission line according to claim 1, wherein, in each of said first and second optical fibers, the difference between the maximum value and the minimum value of the dispersion thereof in the wavelength band is 2.0 ps/nm/km or less.

3. An optical transmission line according to claim 1, wherein, in the wavelength band, the difference between the maximum value and the minimum value of the average dispersion value is 1.0 ps/nm/km or less.

4. An optical transmission line according to claim 3, wherein, in the wavelength band, an absolute value of the average dispersion value is 1.0 ps/nm/km or less.

5. An optical transmission line according to claim 3, wherein, in the wavelength band, the difference between the maximum value and the minimum value of the average dispersion value is 0.5 ps/nm/km or less.

6. An optical transmission line according to claim 5, wherein, in the wavelength band, an absolute value of the average dispersion value obtained from each fiber length and each dispersion value of said first and second optical fibers is 0.5 ps/nm/km or less.

7. An optical transmission line according to claim 1, wherein each of said first and second optical fibers has an effective area of 40 $\mu m^2$ or more at a wavelength of 1550 nm.

8. An optical transmission line according to claim 1, wherein each of said first and second optical fibers has a bending loss of 0.5 dB or less at a wavelength of 1620 nm when it is wound one turn at a diameter of 32 mm.

9. An optical fiber having:
a dispersion having an absolute value of 1.0 to 8.0 ps/nm/km and a difference of 3.0 ps/nm/km or less between a maximum value and a minimum value in a wavelength band of 1530 to 1620 nm; and
a bending loss of 0.5 dB or less at a wavelength of 1620 nm when it is wound one turn at a diameter of 32 mm.

10. An optical fiber according to claim 9, wherein in the wavelength band, the dispersion has the difference of 2.0 ps/nm/km or less between the maximum value and the minimum value.

11. An optical fiber according to claim 9, further comprising an effective area of 40 $\mu m^2$ or more at a wavelength of 1550 nm.

12. An optical fiber according to claim 9, further comprising:
a first core extending along a predetermined axis;
a second core provided on an outer periphery of said first core and having a refractive index lower than that of said first core;
a third core provided on an outer periphery of said second core and having a refractive index higher than that of said second core;
an inner cladding provided on an outer periphery of said third core and having a refractive index lower than that of said third core; and
an outer cladding provided on an outer periphery of said inner cladding and having a refractive index higher than that of inner cladding.

13. An optical fiber comprising:
a dispersion of −8.0 to −1.0 ps/nm/km and a difference of 3.0 ps/nm/km or less between a maximum value and a minimum value in a wavelength band of 1530 to 1620 nm; and
an effective area of less than 60$\mu m^2$ at a wavelength of 1550 nm.

14. An optical fiber according to claim 13, wherein in the wavelength band, the dispersion has the difference of 2.0 ps/nm/km or less between the maximum value and the minimum value.

15. An optical fiber according to claim 13, wherein the effective area is 40 $\mu m^2$ or more at the wavelength of 1550 nm.

16. A unitary optical fiber with no connection point, comprising first portions and second portions having core diameters different from each other by 2% or more,
wherein each of said first portions has a dispersion of +1.0 to +8.0 ps/nm/km in a wavelength band of 1530 to 1620 nm, and a difference of 3.0 ps/nm/km or less between a maximum value and a minimum value of the dispersion thereof, and
wherein said second portions has a dispersion of −1.0 to −8.0 ps/nm/km in the wavelength band, and a difference of 3.0 ps/nm/km or less between a maximum value and a minimum value of the dispersion thereof.

17. An optical fiber according to claim 16, wherein, in each of said first and second portions, the difference between the maximum value and the minimum value of the dispersion thereof in the wavelength band is 2.0 ps/nm/km or less.

18. An optical transmission line in which a plurality of optical fibers of claim 15 are optically connected to each other,
wherein, in a wavelength band of 1530 to 1620 nm, a difference between a maximum value and a minimum value of an average dispersion value obtained from each fiber length and each dispersion value of said plurality of optical fibers is 2.0 ps/nm/km or less.

19. An optical transmission line according to claim 18, wherein, in the wavelength band, the difference between the maximum value and the minimum value of the average dispersion is 1.0 ps/nm/km or less.

20. An optical transmission line according to claim 19, wherein, in the wavelength band, the difference between the maximum value and the minimum value of the average dispersion is 0.5 ps/nm/km or less.

21. An optical transmission line according to claim 18, wherein, in the wavelength band, an absolute value of the average dispersion is 1.0 ps/nm/km or less.

* * * * *